US011927367B2

(12) United States Patent
Leslie et al.

(10) Patent No.: US 11,927,367 B2
(45) Date of Patent: Mar. 12, 2024

(54) ASSEMBLY AND METHOD FOR ATTACHING A HELIOSTAT TO A FOUNDATION

(71) Applicant: Vast Solar Pty Ltd, Darlinghurst (AU)

(72) Inventors: Bruce Alexander Leslie, Darlinghurst (AU); Benjamin Charles Plant, Darlinghurst (AU)

(73) Assignee: Vast Solar Pty Ltd., Sydney (AU)

( * ) Notice: Subject to any disclaimer, the term of this patent is extended or adjusted under 35 U.S.C. 154(b) by 289 days.

(21) Appl. No.: 17/601,343

(22) PCT Filed: Apr. 3, 2020

(86) PCT No.: PCT/AU2020/050333
§ 371 (c)(1),
(2) Date: Oct. 4, 2021

(87) PCT Pub. No.: WO2020/198803
PCT Pub. Date: Oct. 8, 2020

(65) Prior Publication Data
US 2022/0196294 A1    Jun. 23, 2022

(30) Foreign Application Priority Data

Apr. 4, 2019  (AU) ................................ 2019901160

(51) Int. Cl.
*F24S 25/636*    (2018.01)
*F24S 25/60*    (2018.01)
(52) U.S. Cl.
CPC ..... *F24S 25/636* (2018.05); *F24S 2025/6003* (2018.05)
(58) Field of Classification Search
None
See application file for complete search history.

(56) References Cited

U.S. PATENT DOCUMENTS

| 4,367,053 A | 1/1983 | Stratienko et al. |
| 4,537,526 A | 8/1985 | Harti |

(Continued)

FOREIGN PATENT DOCUMENTS

| CL | 2012002534 A1 | 5/2013 |
| CL | 51089-2012001447 A1 | 6/2013 |

(Continued)

OTHER PUBLICATIONS

Fiber Sense Limited, Communication Pursuant to Article 94(3), EP17869895.7, Apr. 23, 2023, 47 pgs.

(Continued)

*Primary Examiner* — Steven M Marsh
(74) *Attorney, Agent, or Firm* — Morgan, Lewis & Bockius LLP

(57) ABSTRACT

This disclosure relates to an assembly and method for attaching a heliostat to a foundation in a tower-based solar thermal CSP installation. A heliostat securing assembly for securing a heliostat to a tubular foundation post comprises an insert locatable within an upper opening in the foundation post, the insert defining an aperture for receiving a support shaft of the heliostat. A clamp arrangement, for locating the insert in the upper opening in the foundation post, has at least one inner or outer bearing surface configured to bear against at least one corresponding outer or inner bearing surface of the insert. One or more urging connectors, for connecting the insert and the clamp arrangement, is operable to urge at least one of the insert and the clamp arrangement toward the other in an axial direction of the foundation post. At least one of the at least one outer or inner bearing surface and the at least one corresponding inner or outer bearing surface is configured to transform at least a portion of relative axial movement between the insert and the clamp into relative transverse movement such that, when the insert (Continued)

is located in the upper opening in the foundation post, operation of the urging connector(s) urges at least one of the insert and clamp arrangement in the transverse direction to clamp the securing assembly between the support shaft and foundation post and thereby secure the heliostat to the foundation post.

28 Claims, 14 Drawing Sheets

(56) References Cited

U.S. PATENT DOCUMENTS

| | | | |
|---|---|---|---|
| 4,557,621 A | 12/1985 | Müllenberg | |
| 7,136,156 B1 | 11/2006 | Quint | |
| 8,981,271 B1 | 3/2015 | Risner et al. | |
| 2010/0071755 A1* | 3/2010 | Kruse | F24S 25/632 136/251 |
| 2010/0158431 A1 | 6/2010 | Huffman et al. | |
| 2011/0069302 A1 | 3/2011 | Hill et al. | |
| 2012/0226452 A1 | 9/2012 | Hill et al. | |
| 2012/0230629 A1 | 9/2012 | Hill et al. | |
| 2013/0092156 A1 | 4/2013 | Quero Garcia et al. | |
| 2013/0146554 A1* | 6/2013 | Berry | F24S 25/12 211/175 |
| 2013/0199183 A1 | 8/2013 | Navio Gila berte et al. | |
| 2013/0319962 A1* | 12/2013 | Park | F16B 5/0635 211/41.1 |
| 2015/0082924 A1* | 3/2015 | Morgan | F24S 30/425 74/89.14 |
| 2015/0083112 A1 | 3/2015 | Ayvazian et al. | |
| 2015/0183066 A1* | 7/2015 | Lippert | F24S 25/636 29/428 |
| 2015/0316639 A1* | 11/2015 | Russ | H02S 20/00 250/203.4 |
| 2015/0340985 A1 | 11/2015 | Cantolino | |
| 2016/0252414 A1 | 9/2016 | Preston et al. | |
| 2017/0191700 A1 | 7/2017 | Fisher | |
| 2017/0279405 A1* | 9/2017 | Wares | H02S 30/10 |
| 2017/0353143 A1* | 12/2017 | Stearns | F24S 25/70 |
| 2018/0069502 A1* | 3/2018 | Wentworth | F24S 25/636 |
| 2019/0368779 A1* | 12/2019 | Chen | F24S 40/85 |

FOREIGN PATENT DOCUMENTS

| | | |
|---|---|---|
| CN | 101051869 A | 10/2007 |
| CN | 102243795 A | 11/2011 |
| CN | 107283145 A | 10/2017 |
| DE | 202013100637 | 5/2014 |
| JP | S5382668 U | 7/1978 |
| WO | WO2013/024369 A1 | 2/2013 |
| WO | WO2015/158926 A1 | 10/2015 |

OTHER PUBLICATIONS

Vast Solar Pty Ltd, International Search Report and Written Opinion, PCT/AU2020/050333, dated May 25, 2020, 9 pgs.

Vast Solar Pty Ltd, International Preliminary Report on Patentability, PCT/AU2020/050333, dated Sep. 28, 2022, 5 pgs.

Vast Solar Pty Ltd, Extended European Search Report, EP20783765.9, dated Dec. 5, 2022, 9 pgs.

Vast Solar Pty Ltd, Notice of Non-Compliance and Invitation to Submit Amendment, African Application AR/AP/P/2021/013549 dated Oct. 12, 2023, 4 pgs.

Vast Solar Pty Ltd, Examination Report, Chilean Application CL202102565, dated Jan. 30, 2023, 15 pgs.

Vast Solar Pty Ltd, Examination Report, Chilean Application CL202102565, dated May 2, 2023, 14 pgs.

Vast Solar Pty Ltd, Examination Report, Egyptian Application EG2021101577, dated Aug. 21, 2023, 17 pgs.

Vast Solar Pty Ltd, Examination Report, Indian Application IN202147050420, dated Sep. 1, 2023, Sep. 1, 2023, 5 pgs.

Vast Solar Pty Ltd, Examination Report, South Arabia Application SA521430513, dated Dec. 27, 2022, 14 pgs.

* cited by examiner

ASSEMBLY AND METHOD FOR ATTACHING A HELIOSTAT TO A FOUNDATION

CROSS REFERENCE TO RELATED APPLICATIONS

This Application is a United States National Stage Application filed under 35 U.S.C. § 371 of PCT Patent Application Serial No. PCT/AU2020/050333, filed on Apr. 3, 2020, which claims the benefit of and priority to Australian Patent Application No. 2019901160, filed on Apr. 4, 2019. Each of these two applications is hereby incorporated by reference in its entirety.

FIELD OF THE INVENTION

This disclosure relates to an assembly and method for attaching a heliostat to a foundation in a tower-based solar thermal CSP installation.

BACKGROUND OF THE INVENTION

In a tower-based solar thermal CSP installation, many heliostats are required. The heliostats need to be installed as cheaply, quickly and accurately as possible. Each heliostat includes a mirror, which needs to be supported around its centre of gravity, and therefore requires a foundation post to support the mirror above the ground. A simple foundation post providing suitable bending and torsional support is a hollow section steel member, either circular or rectangular in section, inserted in the ground in a way that allows the heliostat to be cantilevered.

There are several ways of installing a hollow section post in the ground to act as the foundation for the heliostat. These include vertical hammering, having posts with auger flutes and rotating these into the ground, pre-augered holes with posts installed and concreted into the holes and the surrounding ground compacted, use of concrete plinths and so on.

Regardless of whether the foundation post uses a rectangular or circular hollow section, or how the post is installed in the ground, having a simple way of attaching a heliostat to the top of such a post quickly, securely and reliably is desirable. It is further desirable if the attachment can accommodate some burring or unevenness in the top edge of the post, as may occur during hammering the post into the ground. It is further desirable if the attachment seals the hollow post from ingress of rain. It is also desirable if the attachment means can be affixed to the remainder of the heliostat in a single piece, so that installation of the heliostats in the field can be achieved simply by installing the posts, and then lowering the otherwise complete heliostat onto the post, and securing it in position. It is further desirable if the securing means can be reliably actuated by non-specialist staff.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art. Reference to problems or desiderata in the specification is also not an acknowledgement that such problems or desiderata form part of the common general knowledge.

SUMMARY OF THE INVENTION

In accordance with a first aspect of the present invention there is provided a heliostat securing assembly for securing a heliostat to a tubular foundation post, the assembly comprising: an insert locatable within an upper opening in the foundation post, the insert defining an aperture for receiving a support shaft of the heliostat; a clamp arrangement for locating the insert in the upper opening in the foundation post, the clamp arrangement having at least one inner or outer bearing surface configured to bear against at least one corresponding outer or inner bearing surface of the insert; and one or more urging connectors for connecting the insert and the clamp arrangement, the urging connector(s) being operable to urge at least one of the insert and the clamp arrangement toward the other in an axial direction of the foundation post; wherein at least one of the at least one outer or inner bearing surface and the at least one corresponding inner or outer bearing surface is configured to transform at least a portion of relative axial movement between the insert and the clamp into relative transverse movement such that, when the insert is located in the upper opening in the foundation post, operation of the urging connector(s) urges at least one of the insert and clamp arrangement in the transverse direction to clamp the securing assembly between the support shaft and foundation post and thereby secure the heliostat to the foundation post.

Advantageously, operation of the urging connector(s) urges at least one of the insert and clamp in the transverse direction to clamp the securing assembly between the support shaft and foundation post and thereby secure the heliostat to the foundation post.

In an embodiment, this can be achieved by forming the at least one outer bearing surface of the insert and the inner bearing surface of the clamp with a corresponding inclination relative to the axial direction. It will be appreciated that, in other examples, such a transformation of relative axial movement to relative transverse movement may be achieved with other bearing surface configurations.

The insert may comprise an integrally formed, continuous annular cover portion and an insert portion formed integrally with the cover portion. The cover portion may also be formed separately and then fixed onto the insert portion. The cover portion can act as a locating flange configured to axially locate the securing assembly in the upper opening of the foundation post during the process of securing the heliostat to the foundation post. Accordingly, operation of the urging connector(s) urges the clamp toward the cover portion of the insert. Such a locating flange may simplify the securing process, reduce the number of staff required to secure the heliostat to the foundation post and/or reduce the amount of time needed.

The lower face of the cover portion may be provided with an annular recess for accommodating the upper peripheral edge of the upper opening of the foundation post, which may assist in covering any burring or unevenness caused during the foundation post installation process, as well as in creating a weatherproof seal.

In an embodiment, the clamp comprises a single clamping wedge, the at least one inner or outer bearing surface being formed by an inclined surface on the clamping wedge, and the securing assembly includes a single urging connector connecting the clamping wedge to the insert.

In accordance with a second aspect of the present invention there is provided a method of securing a heliostat to a tubular foundation post, the method comprising the steps of: fitting an insert of a securing assembly to a support shaft of the heliostat, the insert defining an aperture for receiving said support shaft; locating the insert in the upper opening in the foundation post with a clamp arrangement, the clamp arrangement having at least one inner or outer bearing surface configured to bear against at least one outer or inner bearing surface of the insert; and operating one or more urging connectors that connect the insert and the clamp arrangement to urge at least one of the insert and the clamp arrangement toward the other in an axial direction of the foundation post such that at least one of the insert and clamp arrangement is urged in the transverse direction to clamp the securing assembly between the support shaft and foundation post and thereby secure the heliostat to the foundation post.

In accordance with a third aspect of the invention there is provided a heliostat arrangement comprising: a tubular foundation post; a heliostat securing assembly according to the first aspect, the securing assembly received in an open upper end of the tubular foundation post; and a heliostat comprising: a drive assembly comprising a support shaft received in the heliostat securing assembly; and a mirror supported on the drive assembly such that the heliostat mirror can be adjusted by the drive assembly to track the sun and keep it focussed on a receiver or target, wherein the securing assembly is clamped between the support shaft and foundation post to thereby secure the heliostat to the foundation post.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
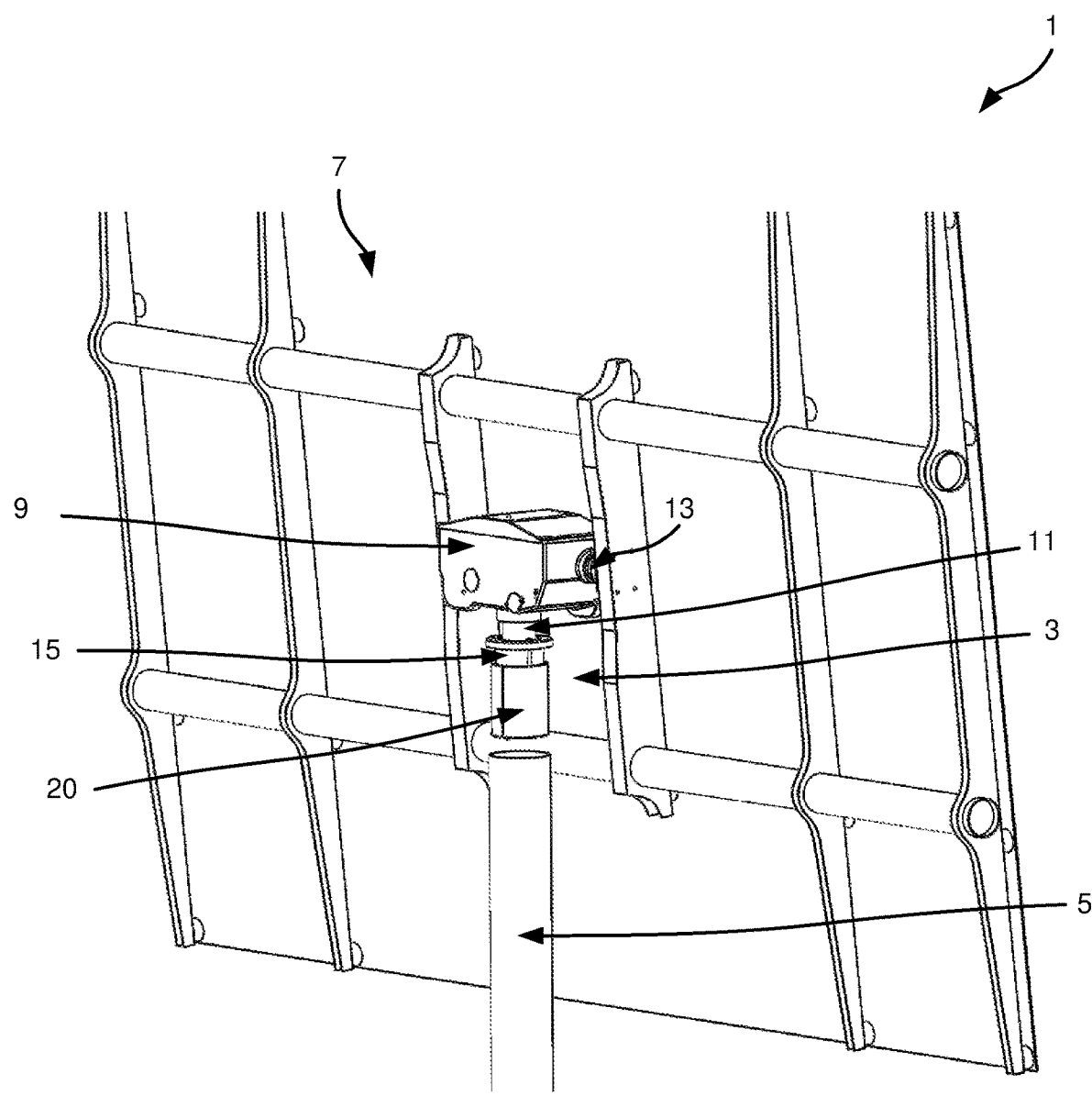
FIG. 1 shows a rear view of one example of a heliostat with a heliostat securing assembly ready for insertion into a foundation post.

Referring first to FIG. 1, a rear view is shown of one example of a heliostat 1 with a heliostat securing assembly 3 ready for insertion into a tubular foundation post 5. The heliostat 1 comprises a frame-mounted mirror 7 and a drive assembly for adjusting the elevation and azimuth angles of the mirror 7. In this example, the drive assembly comprises a rotary drive (not shown) accommodated within a drive housing 9, an azimuth support shaft 11 received within the heliostat securing assembly 3 and an elevation support shaft 13 supporting the mirror 7.

When the heliostat 1 is secured to the foundation post 5 with the heliostat securing assembly 3, as will be described in greater detail below, the drive assembly can drive the heliostat 1 to rotate around the azimuth support shaft 11 to thereby adjust the azimuth angle of the mirror 7 relative to the foundation post 5. Similarly, the drive assembly can drive the frame-mounted mirror 7 to rotate around the elevation support shaft 13 to thereby adjust the elevation angle of the mirror 7 relative to the foundation post 5.

Figure 2A:
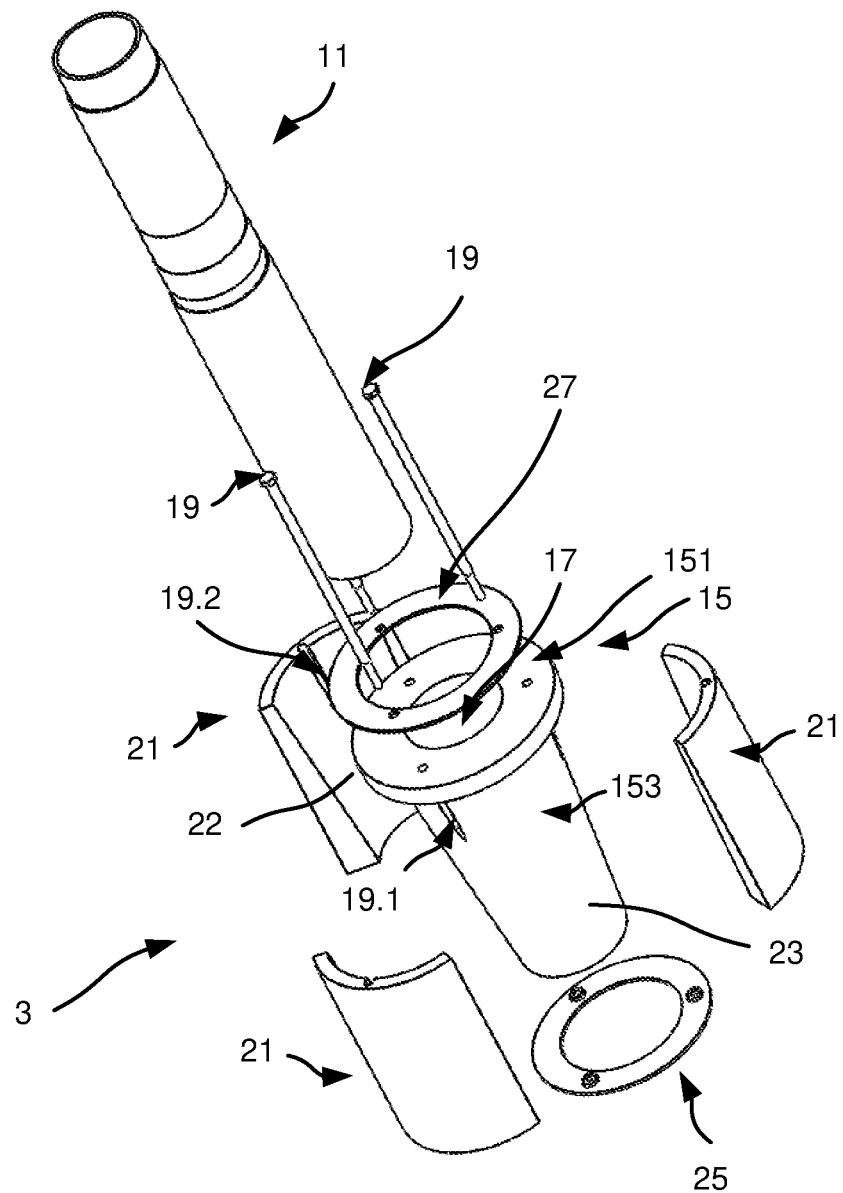
FIGS. 2A and 2B show top perspective exploded views of the heliostat securing assembly.
Figure 2B:
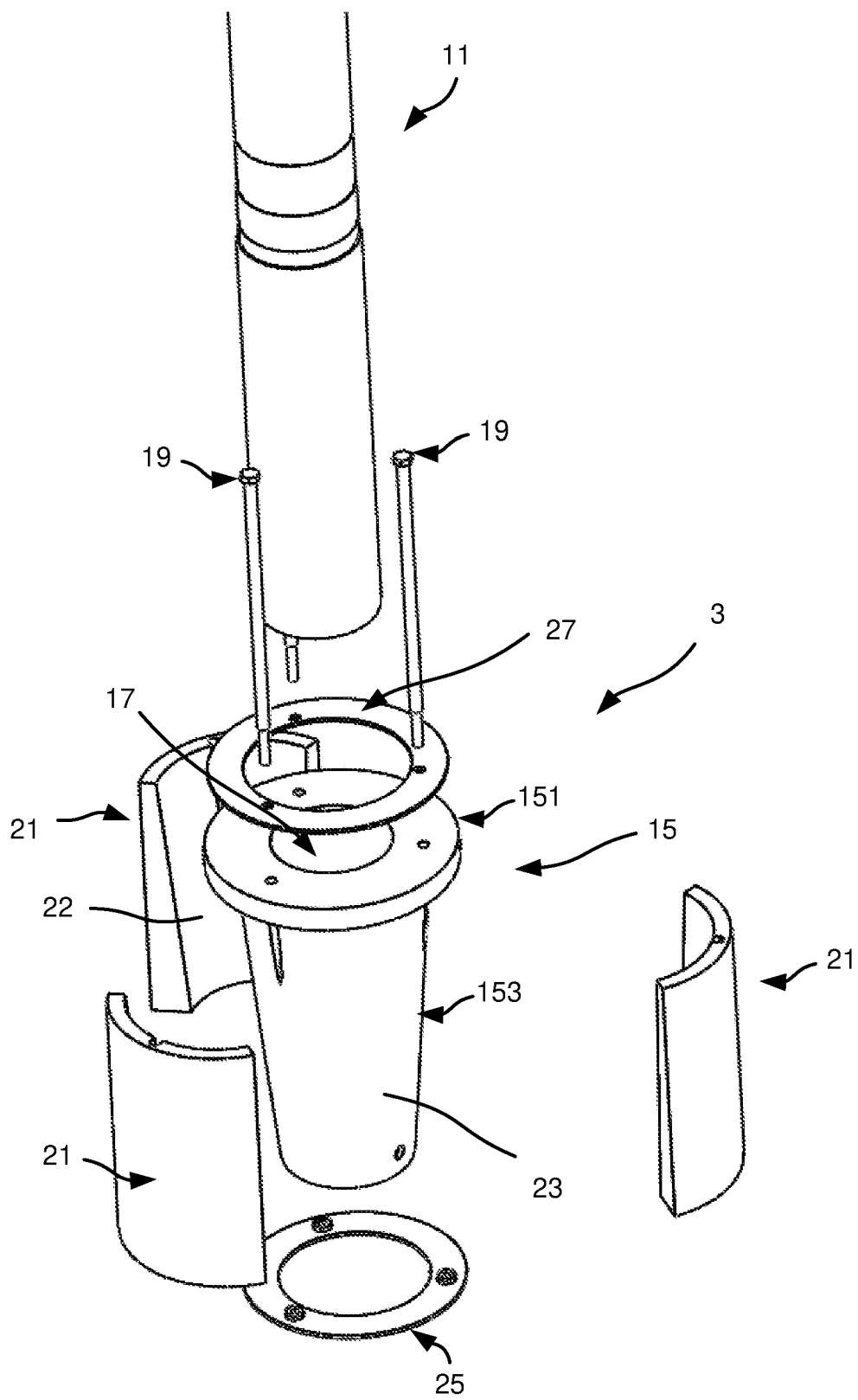
Figure 2C:
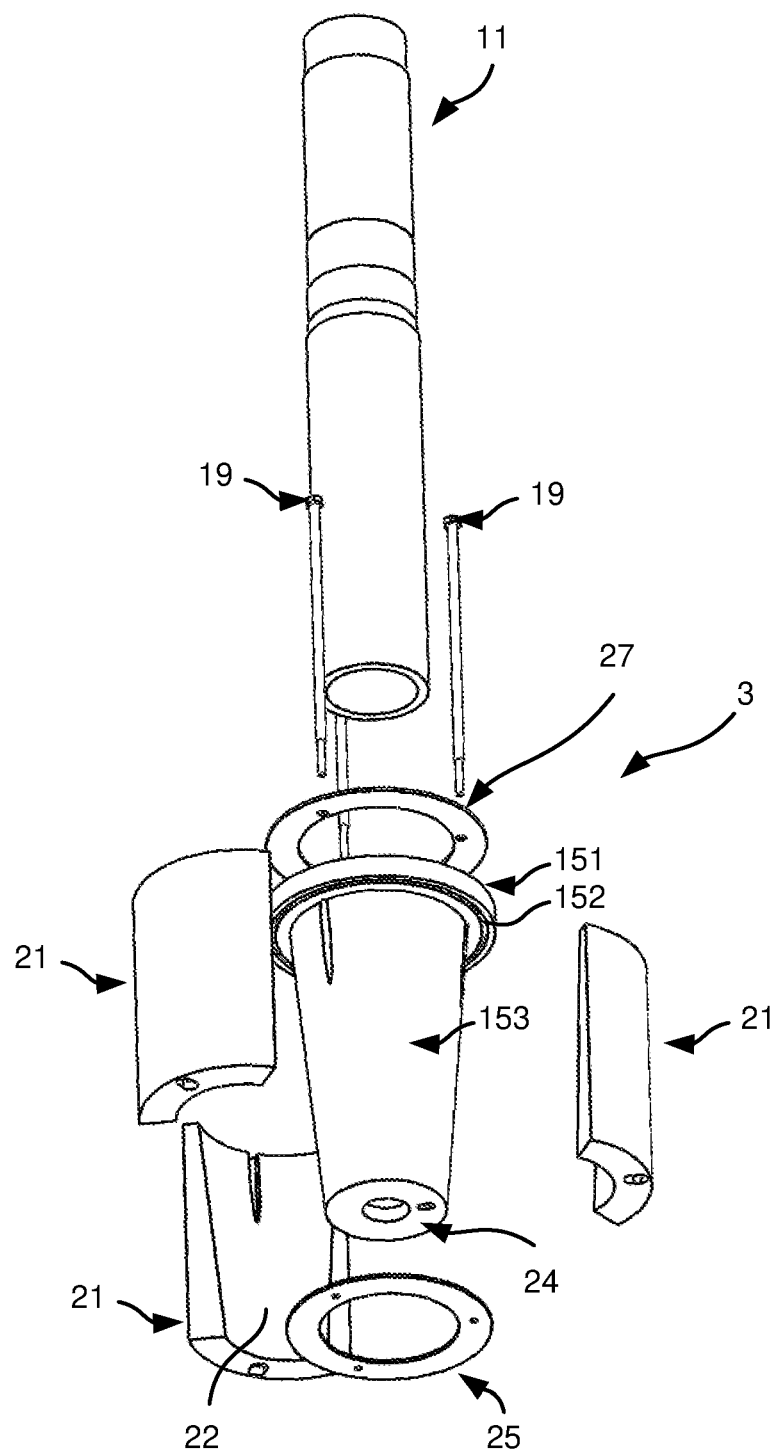
FIG. 2C shows a bottom perspective exploded view of the heliostat securing assembly.

Referring now to FIGS. 2A to 2C, the heliostat securing assembly 3 for securing the heliostat 1 to the tubular foundation post 5 shown in FIG. 1 will be described in more detail.

The securing assembly 3 comprises an insert in the form of a collet sleeve 15 locatable within an upper opening in the foundation post 5, a clamp sub-assembly (20 in FIG. 1) for receiving the collet sleeve 15 in said upper opening and a plurality of urging connectors 19 connecting the collet sleeve 15 and the clamp sub-assembly 20.

The collet sleeve 15 defines an aperture 17 for receiving the azimuth support shaft 11 of the heliostat 1, and has at least one outer bearing surface 23.

The clamp sub-assembly 20 has at least one inner bearing surface configured to bear against the at least one outer bearing surface 23 of the collet sleeve 15. In this example, the clamp sub-assembly 20 comprises three clamping wedges 21 such that the at least one inner bearing surface comprises three inner bearing surfaces 22 configured to bear against the at least one outer bearing surface 23 of the collet sleeve 15.

The urging connectors 19 are operable to urge at least one of the collet sleeve 15 and the clamp sub-assembly 20 toward the other in an axial direction of the foundation post 5. The outer bearing surface 23 of the collet sleeve 15 and each inner bearing surface 22 of the three clamping wedges 21 of the clamp sub-assembly 20 are configured to transform at least a portion of relative axial movement between the collet sleeve 15 and the clamp sub-assembly 20 into relative transverse movement.

With this configuration, when the collet sleeve 15 is located in the upper opening in the foundation post 5, operation of the urging connectors 19 urges at least one of the collet sleeve 15 and clamp sub-assembly 20 in the transverse direction to clamp the securing assembly 3 between the support shaft 11 and foundation post 5 and thereby secure the heliostat 1 to the foundation post 5. In this example, this configuration is achieved by forming the at least one outer bearing surface 23 of the collet sleeve 15 and each inner bearing surface 22 of the three clamping wedges 21 with a corresponding inclination relative to the axial direction. It will be appreciated that, in other examples, such a transformation of relative axial movement to relative transverse movement may be achieved with other bearing surface configurations, e.g. only one of the inner and outer bearing surfaces may be inclined, one or both of the inner and outer bearing surfaces may be formed as a cam surface, which may be curved, etc.

In this example, the insert comprises an integrally formed, continuous annular cover portion 151 and an insert portion 153 formed integrally with the cover portion 151. The cover portion may also be formed separately and then fixed onto the insert portion. The collet sleeve 15 may be formed from a hardened plastics material such as a polycarbonate or GRP, or from a metal such as aluminium or a metallic alloy such as brass. The other components may be formed from similar materials or from any material with suitable strength, stiffness and friction characteristics.

The cover portion 151 acts as a locating flange configured to axially locate the securing assembly 3 in the upper opening of the foundation post 5 during the process of securing the heliostat 1 to the foundation post 5. Accordingly, operation of the urging connectors 19 urges the three clamping wedges 21 of the clamp sub-assembly 20 toward the cover portion 151 of the collet sleeve 15. Such a locating flange may simplify the securing process, reduce the number of staff required to secure the heliostat 1 to the foundation post 5 and/or reduce the amount of time needed.

In this specific example, the cover portion 151 is configured to fit over an upper peripheral edge of the upper opening of the foundation post 5. In this way, the cover portion 151 may also act to prevent the entry of water and other foreign matter into the foundation post 5. The lower face of the cover portion 151 is provided with an annular recess 152 for accommodating the upper peripheral edge of the upper opening of the foundation post 5, which may assist in covering any burring or unevenness caused during the foundation post 5 installation process, as well as in creating a weatherproof seal.

The insert portion 153 extends down from the cover portion 151 into the foundation post 5 when the cover portion 151 is fitted over the upper peripheral edge of the upper opening of the foundation post 5. As the shaft 11 of the heliostat 1 is cylindrical, the aperture 17 defined by the collet sleeve 15 is a complemental cylindrical aperture 17 that extends through the cover portion 151 and into the insert portion 153. The at least one outer bearing surface 23 is formed on the insert portion 153, inclined with respect to the axial direction of the foundation post 5. In this example, the at least one outer bearing surface 23 is formed as a single, continuous outer bearing surface 23 that describes a frusto-conical profile, which extends from the cover portion 151 to a cap end base 24.

The clamping wedges 21 of the clamp sub-assembly 20 are arcuate when viewed in the axial direction of the foundation post 5. The inclined inner bearing surface 22 of each clamping wedge 2, which has a complemental frusto-conical profile, cooperates with the single, continuous outer bearing surface such that operation of the urging connectors 19 causes the inner bearing surfaces 22 of the clamping elements 21 to slide along the frusto-conical outer bearing surface 23 of the collet sleeve 15, axially upwards and radially outwards. Each clamping wedge further comprises an outer clamping surface 26 for forming a friction fit with the foundation post 5 when the clamp sub-assembly is wedged between the collet sleeve 15 and the foundation post 5. In this way, the securing assembly 3 can be clamped between the support shaft 11 and foundation post 5 and thereby secure the heliostat 1 firmly to the foundation post 5.

In this example, the urging connectors 19 comprise equi-spaced clamping bolts 19 with drive heads operable from above the collet sleeve. It will be appreciated that, in other examples, the urging connectors may comprise alternative means, such as eccentric or over-centre cam levers. Threaded nuts or sleeves may be positioned in (embedded) or below the clamping wedges 21 of the clamp sub-assembly 20. Each clamping bolt 19 extends through an aperture 19.1 in the collet sleeve 15 and a corresponding aperture 19.2 in a respective clamping wedge 21 of the clamp sub-assembly 20. It will be appreciated that these apertures are elongated apertures to accommodate the relative axial and transverse (or radial) movement between the collet sleeve 15 and the clamping wedges 21 of the clamp sub-assembly 20.

A lower annular ring washer 25 is provided at the lower surfaces of the clamping wedges 21 of the clamp sub-assembly 20. Such a lower annular ring washer 25 may act as a load transfer element for spreading out forces applied by the threaded nuts or sleeves to the lower surfaces of the clamping wedges 21. It may be advantageous in ensuring that the clamping wedges 21 are held together during the process of inserting the securing assembly 1 into the foundation post 5. This is achieved by virtue of the bolts 19 being pre-installed and loosely engaged with the corresponding nuts or sleeves, with the lower ring washer 25 assisting to hold the assembly together prior to insertion. A corresponding upper annular ring washer 27 is provided at the top surface of the collet sleeve 15 to provide a bearing surface for the bolt heads and a percussive surface for allowing the securing assembly to be hammered into position within the post.

Figure 3A:
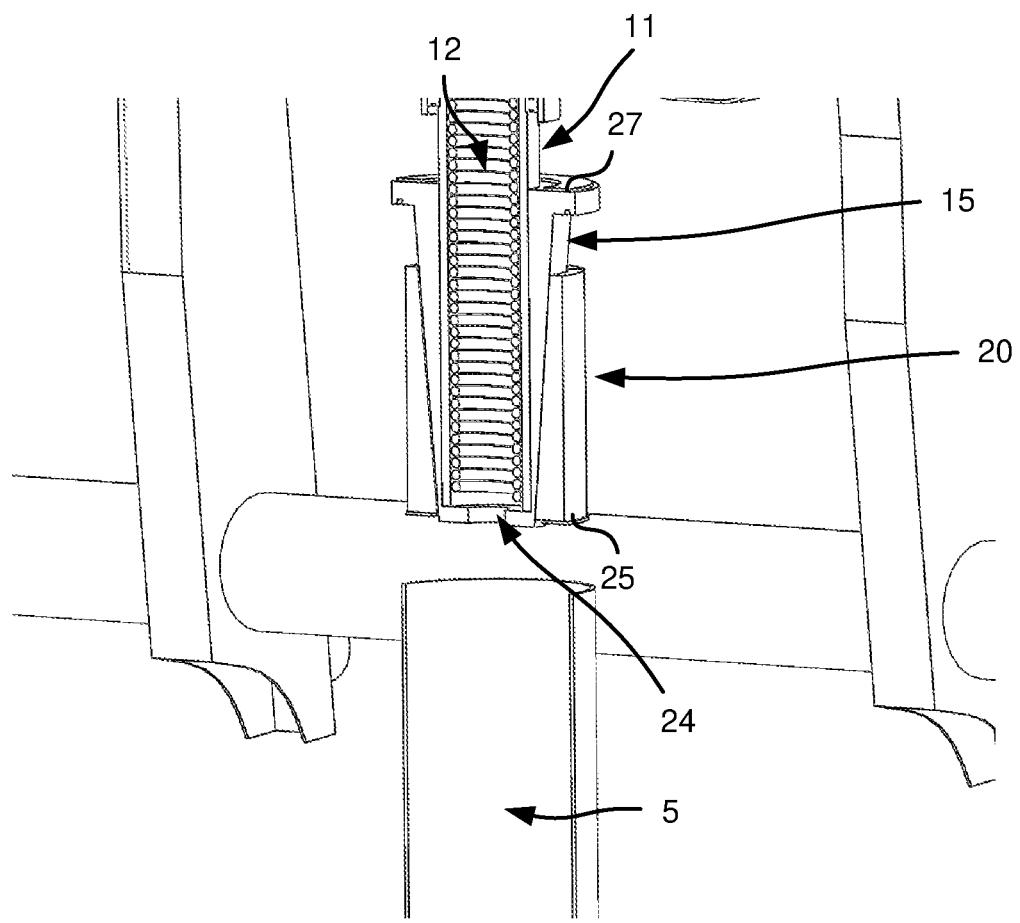
FIG. 3A shows, in cross section, the heliostat support shaft received in the heliostat securing assembly prior to insertion into the foundation post.
Figure 3B:
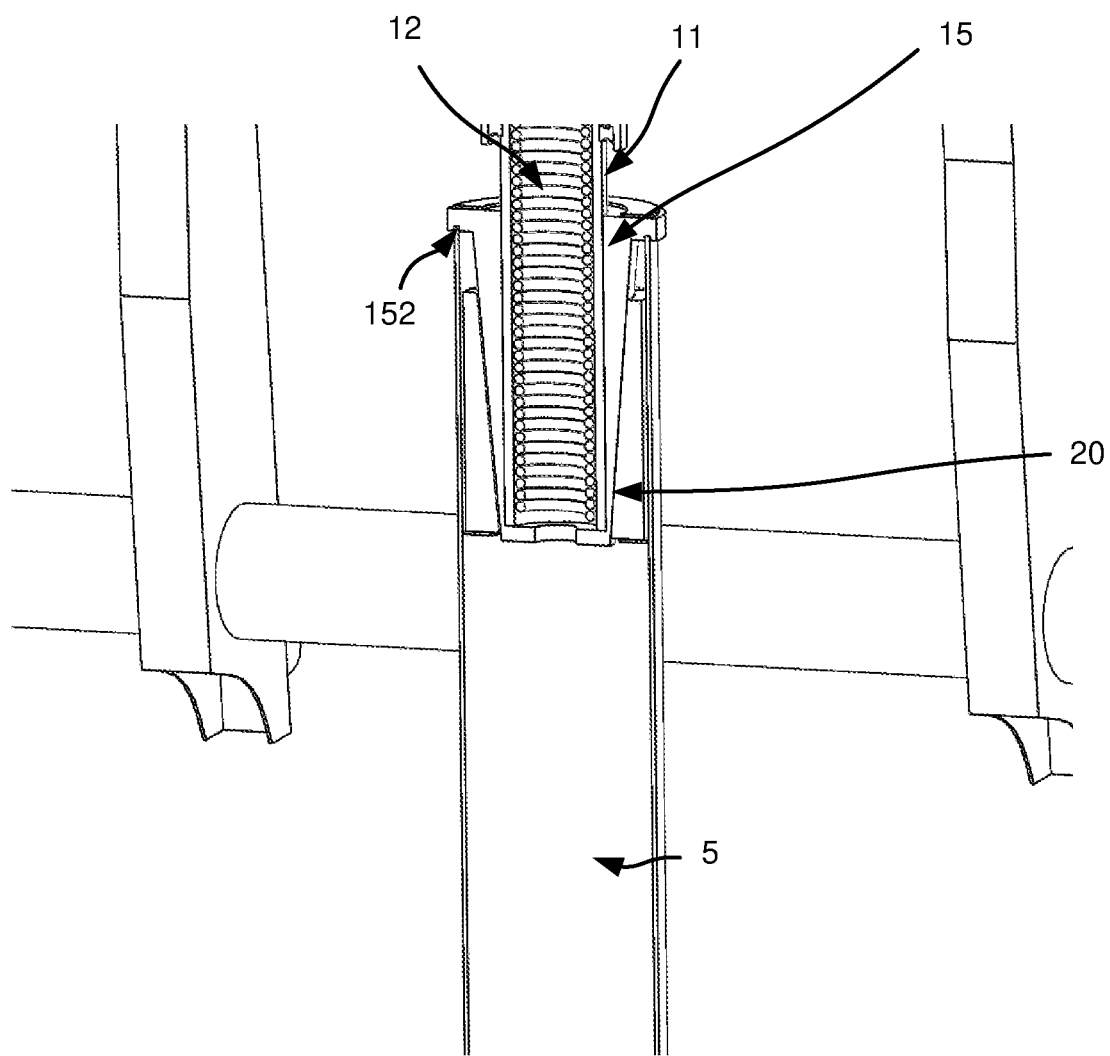
FIG. 3B shows, in cross section, the heliostat securing assembly received in the foundation post and prior to being secured in the foundation post.
Figure 3C:
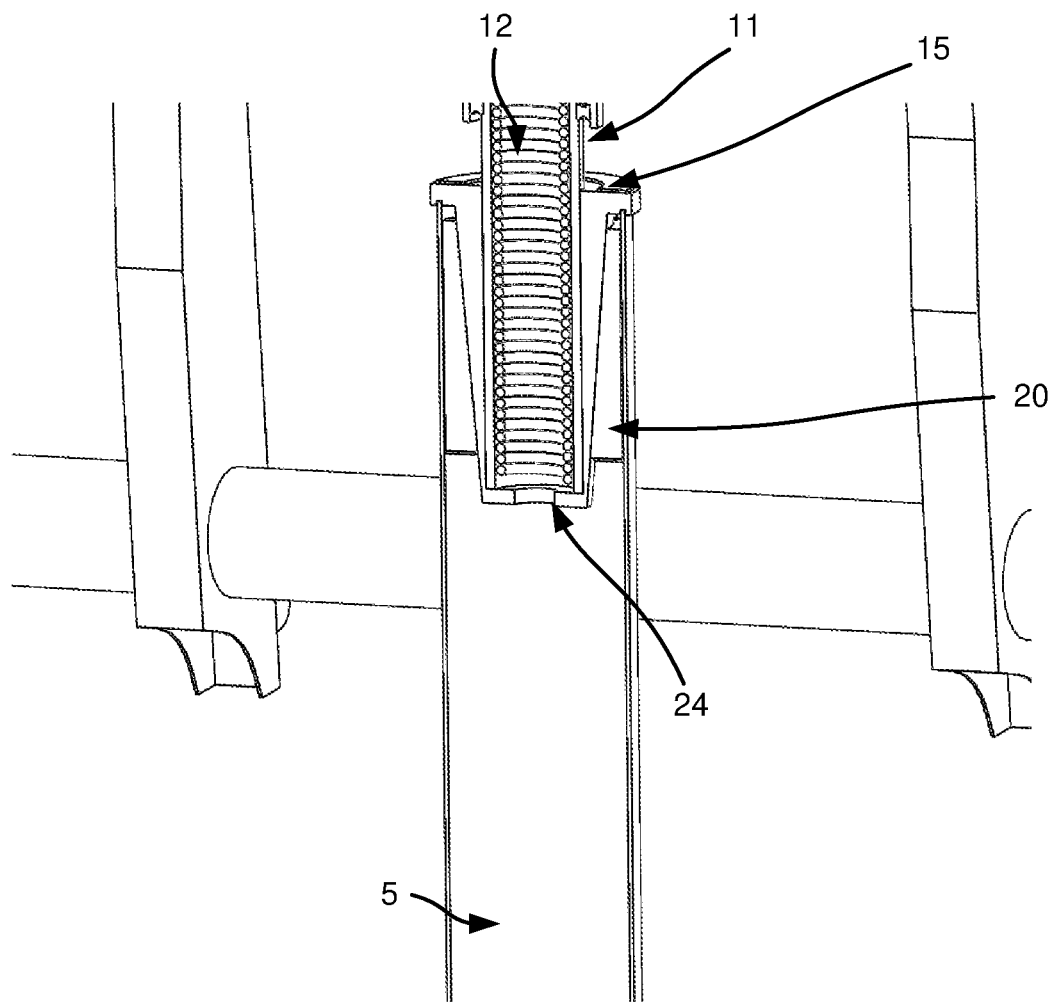
FIG. 3C shows, in cross section, the heliostat securing assembly secured in the foundation post.

Referring now to FIGS. 3A to 3C, a general method of securing the heliostat 1 to the tubular foundation post 5 will be described in more detail.

The insert in the form of collet sleeve 15 of the securing assembly 3 is initially fitted to the support shaft 11 of the heliostat 1, with said support shaft 11 being received within the aperture defined by the collet sleeve 15. The support shaft 11 is a hollow cylindrical section with a torsional spring 12 installed inside to provide tension to the drive assembly around the azimuth adjustment axis. Accordingly, the cap end base 24 of the collet sleeve 15 can be used to retain and enclose the spring 12 in the support shaft 11, which may assist in protecting it from the environment.

In this example, the clearance between the support shaft 11 and the aperture is negligible, or even provides a light interference fit, such that a certain degree of force is required to fit the collet sleeve 15 onto the support shaft 11. The resulting similar fit thus fixes the support shaft 11 in the collet sleeve 15. It will be appreciated that, in other examples, the clearance may be greater and the collet sleeve 15 may be secured to the support shaft 11 via mechanical attachment means, e.g. combinations of mating thread on shaft, cross pins, bolts, splines and glue.

The collet sleeve 15 is then located in the upper opening in the foundation post 5 with the clamp sub-assembly 20, as shown in FIG. 2B. In this example, the clamp sub-assembly 20 is already connected to the collet sleeve 15 by urging connectors (see 19 described above) to allow the entire securing assembly 3 with the heliostat 1 to be inserted as a single unit, which may simplify the location step.

The urging connectors 19 can then be operated to urge the clamp sub-assembly axially upwards towards the cover portion 151 of the collet sleeve. This relative axial movement between the collet sleeve 15 and the clamp sub-assembly 20 urges the clamping elements 21 of the clamp sub-assembly 20 in the transverse or radial direction as the inner bearing surfaces of the clamping elements 21 slide up the frusto-conical outer bearing surface of the collet sleeve. The clamp sub-assembly 20 is thereby wedged between the collet sleeve 15 and the foundation post 5, clamping the securing assembly 3 between the support shaft 11 and foundation post 5 and securing the heliostat 1 to the foundation post 5.

The insert described above comprises the continuous annular cover portion 151 acting as a locating flange configured to axially locate the securing assembly 3. It will be appreciated that, in an alternative example, such a continuous annular cover portion and/or a locating flange may be additionally or alternatively provided on the clamp sub-assembly. When the locating flange is provided on the clamp sub-assembly to axially locate the securing assembly, operation of the urging connectors may urge the collet sleeve toward the clamp sub-assembly.

In the example described above, the insert is formed as a collet sleeve with a single body having a single continuous outer bearing surface. It will be appreciated that, in other examples, the insert may have two or more discontinuous inner clamping surfaces and two or more discontinuous outer bearing surfaces, and may be formed from two or more elements rather than a single body. In addition, even if formed as a single body the insert may be formed with a series of equi-spaced vertical expansion/contraction slots extending upwardly from the lower end of the sleeve. Similarly, whilst the clamp sub-assembly described above comprises three clamping elements in the form of clamping wedges, it will be appreciated that, in an alternative example, the clamp sub-assembly may comprise one, two, four or more clamping elements in the form of clamping wedges. It will further be appreciated that, in an example where the insert is formed from two or more elements rather than a single body, the clamp sub-assembly may instead be formed from a single body.

In the example described above, the tubular foundation post 5 has a circular cross section and may be formed from lengths of circular hollow section steel. It will be appreciated that, in other examples, the tubular foundation post may be formed with a different cross sectional shape, such as a hollow section that is rectangular, elliptical, square, etc.

In alternative embodiments the insert may have a round cylindrical outer surface and a frusto-conical inner surface which expands outwardly from top to bottom, so that the corresponding wedges are located between the inner surface of the insert and the outer surface of the support shaft of the heliostat. It will be appreciated that this arrangement may be configured differently to accommodate different post and shaft profiles.

In the example described above, the drive assembly comprises a rotary drive (not shown). It will be appreciated that, in other examples, the drive may be a linear drive.

Figure 4:
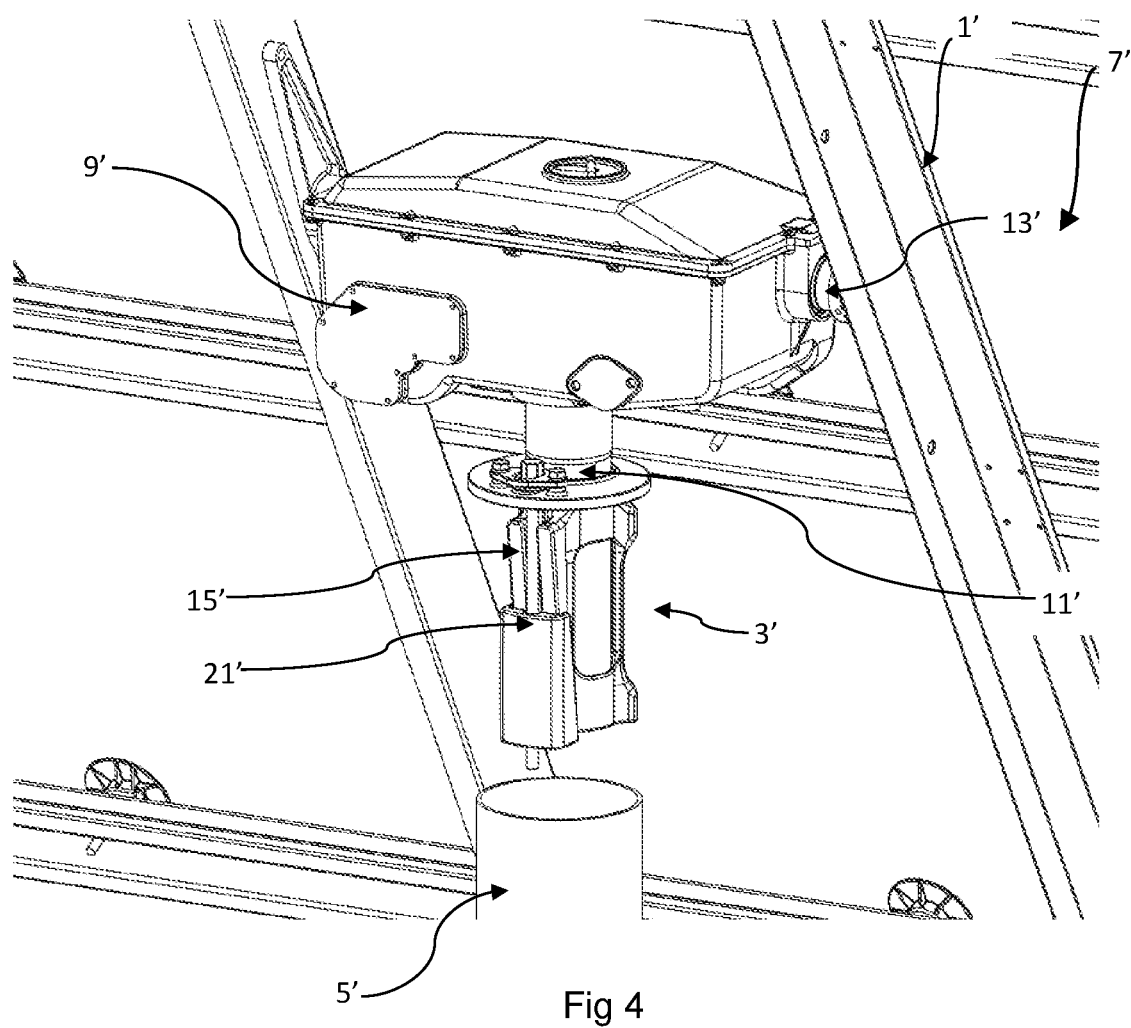
FIG. 4 shows a rear perspective view of another example of a heliostat with a heliostat securing assembly and heliostat ready for insertion into a foundation post.

Reference is now made to FIG. 4, which illustrates a rear view of another embodiment of a heliostat 1' with a heliostat securing assembly 3' ready for insertion into a tubular foundation post 5'. Components of this embodiment are referenced using like reference numerals to those used with respect to the previous embodiment (where applicable), with the addition of an apostrophe. It will appreciated that unless otherwise stated, the features shown in this embodiment have the same function and advantages as the corresponding features of the earlier embodiment.

The securing assembly 3' comprises an insert, substantially in the form of a collet sleeve 15', locatable within an upper opening in the foundation post 5', a clamping wedge 21' operatively engageable with the collet sleeve 15' and movable relative to the collet sleeve 15' in said upper opening, and a single urging connector 19' (FIG. 5) connecting the collet sleeve 15' and the clamping wedge 21'.

As will be described in further detail below, this embodiment of the invention utilises a single clamping wedge and single urging connector arrangement in order to effectively produce the same result as the earlier embodiment, i.e. to transform at least a portion of relative axial movement between the insert and the clamping wedge into relative transverse movement such that, when the insert is located in the upper opening in the foundation post, operation of the urging connector urges at least one of the insert and clamping wedge in the transverse direction to clamp the securing assembly between the support shaft and foundation post and thereby secure the heliostat to the foundation post.

Figure 5:
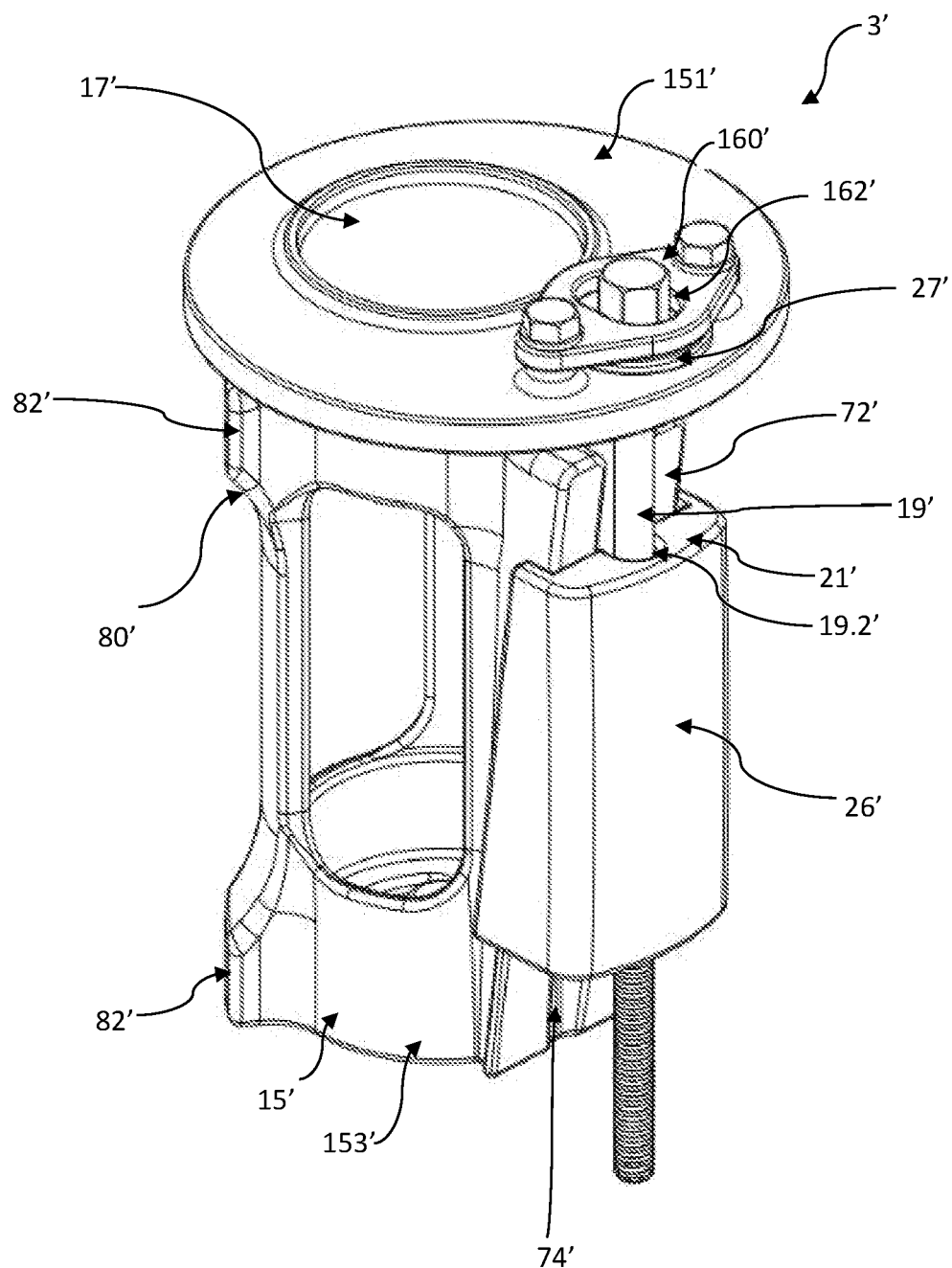
FIG. 5 shows a top perspective view of the heliostat securing assembly of FIG. 4.

FIG. 5 illustrates the insert, the clamping wedge 21' and the urging connector, which is in the form of a clamping bolt 19', when assembled together before placement into the foundation post 5'. Similar to the earlier example, collet sleeve 15' defines an aperture 17' for receiving the azimuth support shaft 11' of the heliostat 1'.

The insert further comprises an integrally formed cover portion 151' and an insert portion 153' formed integrally with the cover portion 151'. The insert portion 153' extends down from the cover portion 151 into the foundation post 5' when the cover portion 151' is fitted over the upper peripheral edge of the upper opening of the foundation post 5'. Cover portion 151' also includes bolt aperture 154' (FIG. 7), through which clamping bolt 19' is inserted in order to suitably connect the insert with clamping wedge 21'. As the shaft 11' of the heliostat 1' is cylindrical, the aperture 17' defined by the collet sleeve 15' is a complemental cylindrical aperture 17' that extends through the cover portion 151' and into the insert portion 153'. The features and advantages described earlier in relation to the cover portion 151, equally apply to cover portion 151'.

The insert portion 153' in this embodiment has been optimised by removing as much mass as practicable from the collet sleeve 15'. This can lead to a reduction in overall manufacturing and material costs of the collet sleeve. The collet sleeve 15' may be manufactured by casting, machining, or a combination of the two. However, a person skilled in the art will appreciate that the collet sleeve 15' may be manufactured by other means as previously described.

Figure 6:
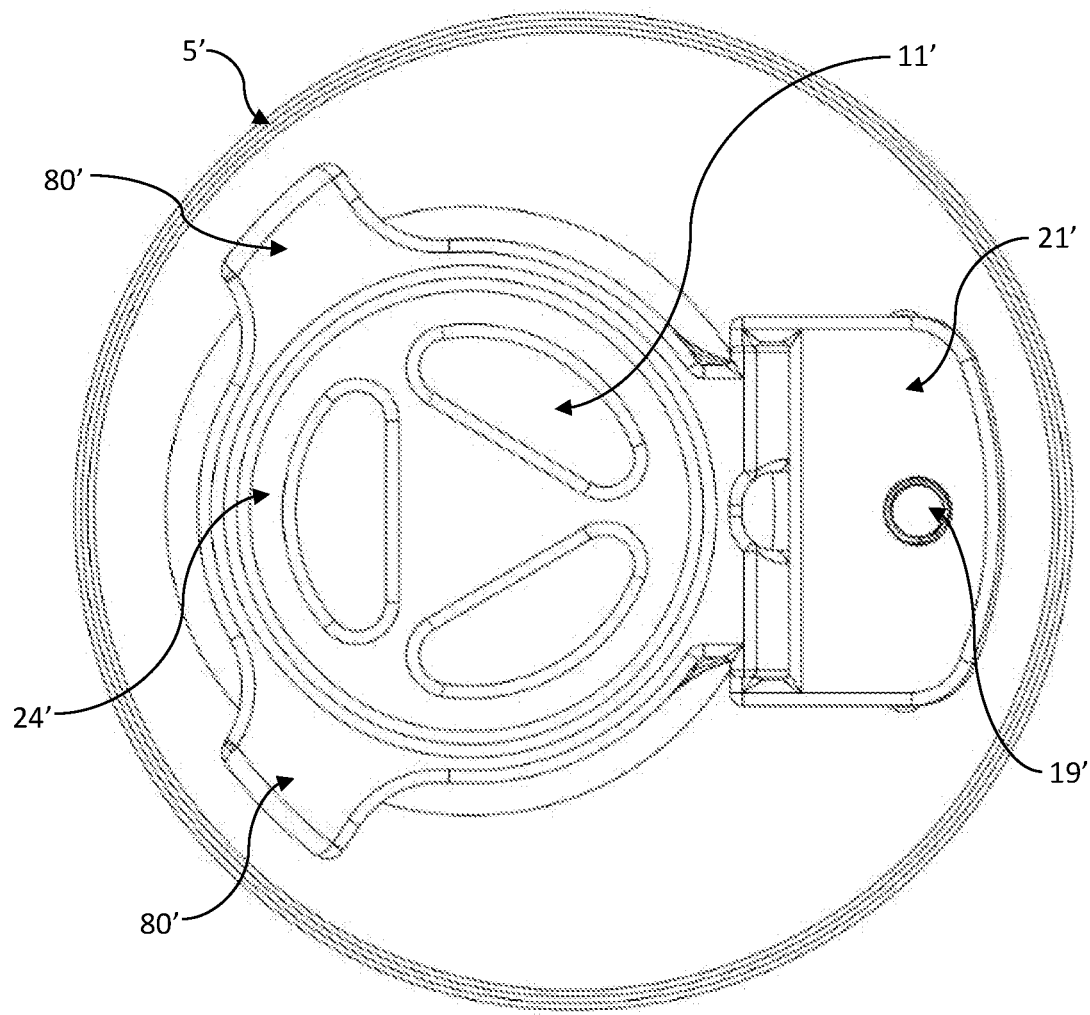
FIG. 6 shows a bottom view of the heliostat securing assembly of FIG. 4 when inserted into a foundation post.

As best shown in FIGS. 5 and 6, aperture 17' of collet sleeve 15' is not concentric with cover portion 151', and is therefore not concentric with the foundation post 5' when the insert is positioned in the upper opening thereof. The advantages of this will be described in greater detail below.

In this embodiment, bolted to cover portion 151' and above the head of clamping bolt 19' by suitable fasteners is a retaining member 160' of substantially planar form, having a main central aperture 162' configured to allow access to the head of clamping bolt 19' for operation thereof, but restrict axial movement of clamping bolt 19'. The retaining member 160' need not be provided in normal operation of the securing assembly, but can aid in removal of the securing assembly as will be described in greater detail below. When retaining member 160' is not being used, the apertures therefor in cover portion 151' are closed with environmental plugs in order to avoid water ingress. As will be described in greater detail below, operation of the clamping bolt 19' will cause the clamping wedge 21' to move towards the collet sleeve 15' in the axial direction.

Figure 7:
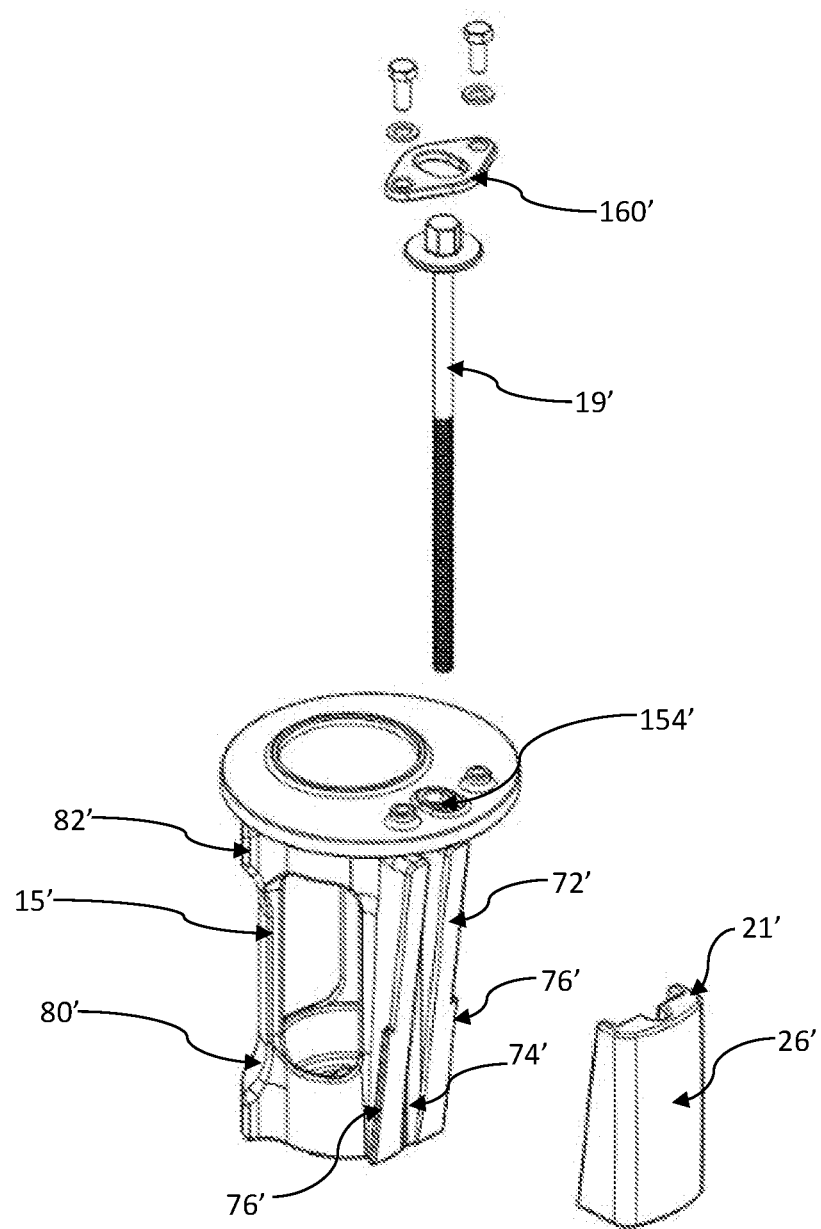
FIG. 7 shows a top perspective exploded view of the heliostat securing assembly of FIG. 4.
Figure 8:
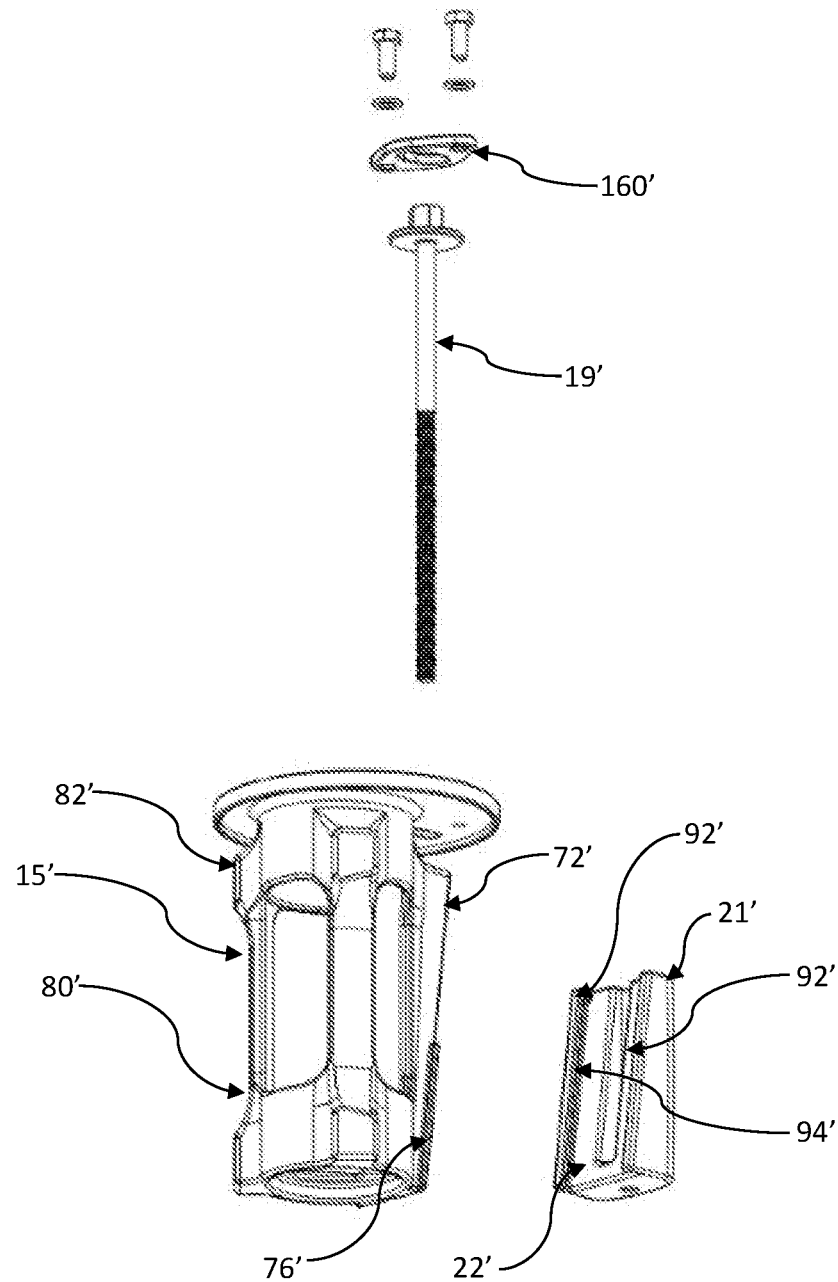
FIG. 8 shows a bottom perspective exploded view of the heliostat securing assembly of FIG. 4.

Unlike in the earlier example where the collet sleeve 15 included a continuous outer bearing surface 23, an outer bearing surface of the collet sleeve 15' comprises separate and distinct outer bearing surface portions. As best shown in FIGS. 7 and 8, these outer bearing surface portions include a pair of spaced, radially extending track portions 72' on one side of collet sleeve 15'. The track portions 72' are inclined relative to the axial direction from the lower end of the collet sleeve 15' to the upper end of the collet sleeve 15'. The track portions 72' define a recess 74' therebetween for accommodating clamping bolt 19'. Each track portion 72' includes a tongue 76' extending from a radially outermost face thereof and away from the recess 74'. The track portions 72' are configured to engage with complementary portions located on the clamping wedge 21'.

The collet sleeve 15' further includes one or more (two in the depicted example) stationary reaction members 80' extending radially therefrom, on a side substantially opposite to the track portions 72'. In this example, each stationary reaction member 80' includes a pair of integrally formed and axially spaced contact projections 82', configured to press in a balanced way against the inner wall of the foundation post 5' when transverse movement of the clamping wedge 21' occurs. The stationary reaction members 80' of the collet sleeve 15' work in combination with an outer clamping surface 26' of clamping wedge 21' in order to clamp the securing assembly 3' between the support shaft 11' and the foundation post 5' and thereby secure the heliostat 1' to the foundation post 5'. In other words, unlike the earlier embodiment that utilised only clamping surfaces 26 of the clamping elements 21 to engage against the inner wall of the foundation post 5, in this further embodiment, both the outer clamping surfaces 26' of clamping wedge 21' and contact projections 82' of the stationary reaction members 80' engage against the inner wall of the foundation post 5', forming a friction fit with the foundation post 5'. In this way, the securing assembly 3' can be clamped between the support shaft 11' and foundation post 5' and thereby secure the heliostat 1' firmly to the foundation post 5'.

The stationary reaction members 80' in this example are spaced about +/−60 degrees relative to a transverse axis when viewed in plan and passing through the centreline of the wedge (FIG. 6). However, it will be appreciated that the stationary reaction members 80' could also be spaced at wider or narrower angles. For example, the stationary reaction members could be spaced between +/−30° to +/−80°, in which case the number of stationary reaction members opposite the track portions 72' can vary. Ultimately, there will be a compromise between the number of stationary reaction members present, which assist in balancing the loads against the inner wall of the foundation post 5', and the overall mass of the insert. To form a balanced clamping arrangement the reaction members 80' and clamping wedge 21' may be equi-angularly spaced, in the present example by 120°.

The clamping wedge 21' is substantially in the shape of a frusto-conical segment, having an inner bearing surface 22' from which a pair of spaced engagement portions 92' inwardly extend from either side thereof. Each respective engagement portion 92' with the inner bearing surface 22' defines an inner channel 94' configured to slidably receive tongues 76' of track portions 72' of the collet sleeve 15'. The sliding engagement between the tongues 76' and channels 94' allow for the relative axial and radial movement between the collet sleeve 15' and the clamping wedge 21'. Channels 94' have a lower open end for receiving the tongues 76' therein, and a closed upper end, which defines the lowest relative axial position of the clamping wedge 21' relative to the collet sleeve 15'.

It will be appreciated that the outer bearing surface portions (i.e. the track portions 72') of the collet sleeve 15' and the inner bearing surface 22' of the clamping wedge 21' are configured to transform at least a portion of relative axial movement between the collet sleeve 15' and the clamping wedge 21' into relative transverse movement. This again is achieved by forming the track portions 72' of the collet sleeve 15' and/or the inner bearing surface 22' of the clamping wedge 21' with a corresponding inclination relative to the axial direction. This inclination of track portions 72' and inner bearing surface 22' of clamping wedge 21' is preferably between 5° and 7°, although it will be appreciated that the angle of inclination may be larger or smaller than this and still perform the desired function.

The clamping wedge 21' further includes an elongate aperture 19.2' that extends from an upper end to a lower end of the clamping wedge 21'. The aperture 19.2' receives therethrough the clamping bolt 19'. The lower end of the clamping wedge 21' includes internal thread 96' (FIG. 9A) that operatively engages with external thread on the clamping bolt 19'. This threaded engagement between the clamping bolt 19' and the clamping wedge 21' facilitates the relative movement between the collet sleeve 15' and the clamping wedge 21' as will be described below.

Figure 9A:
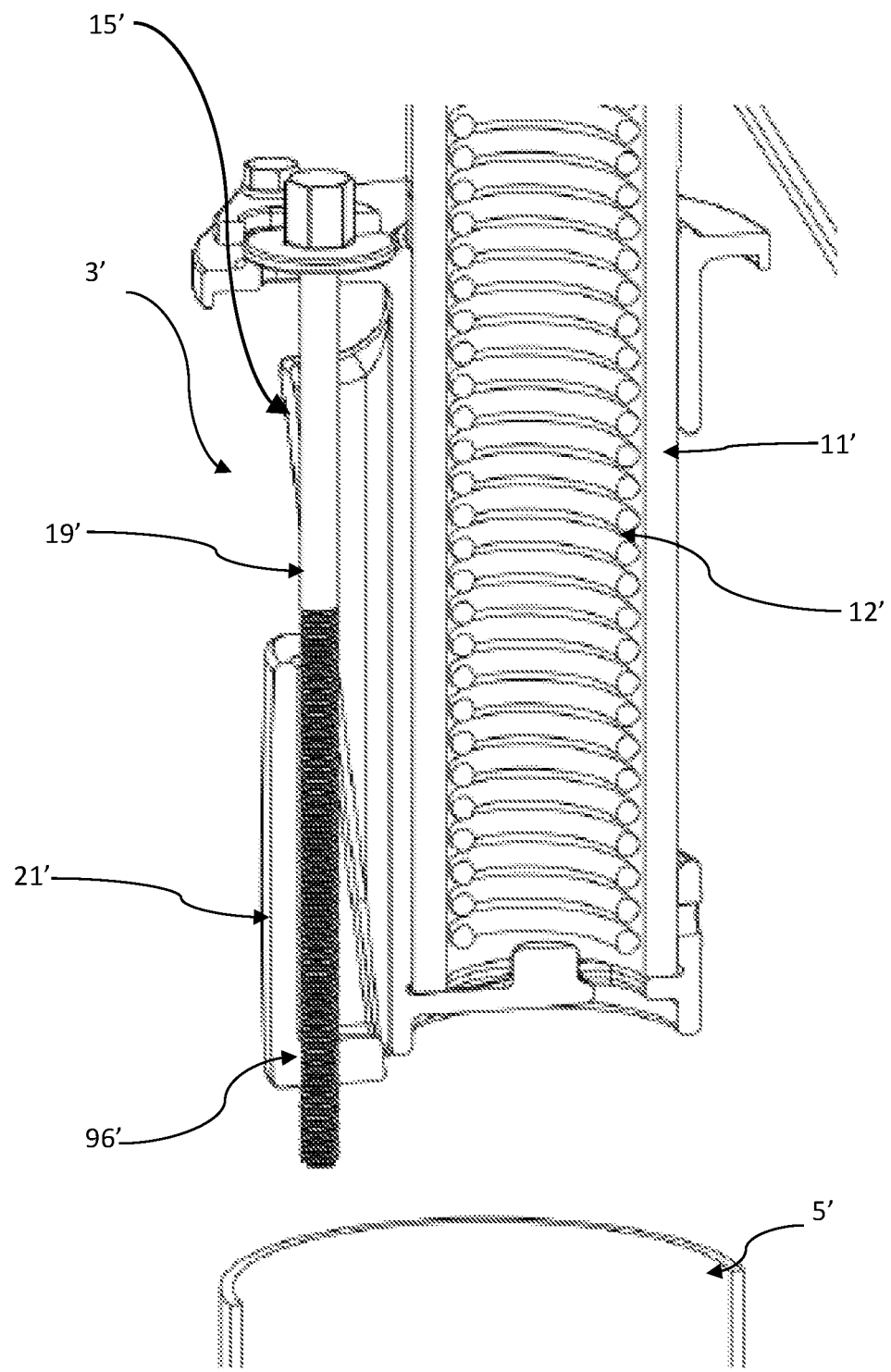
FIG. 9A shows, in cross section, the heliostat support shaft received in the heliostat securing assembly of FIG. 4 prior to insertion into the foundation post.
Figure 9B:
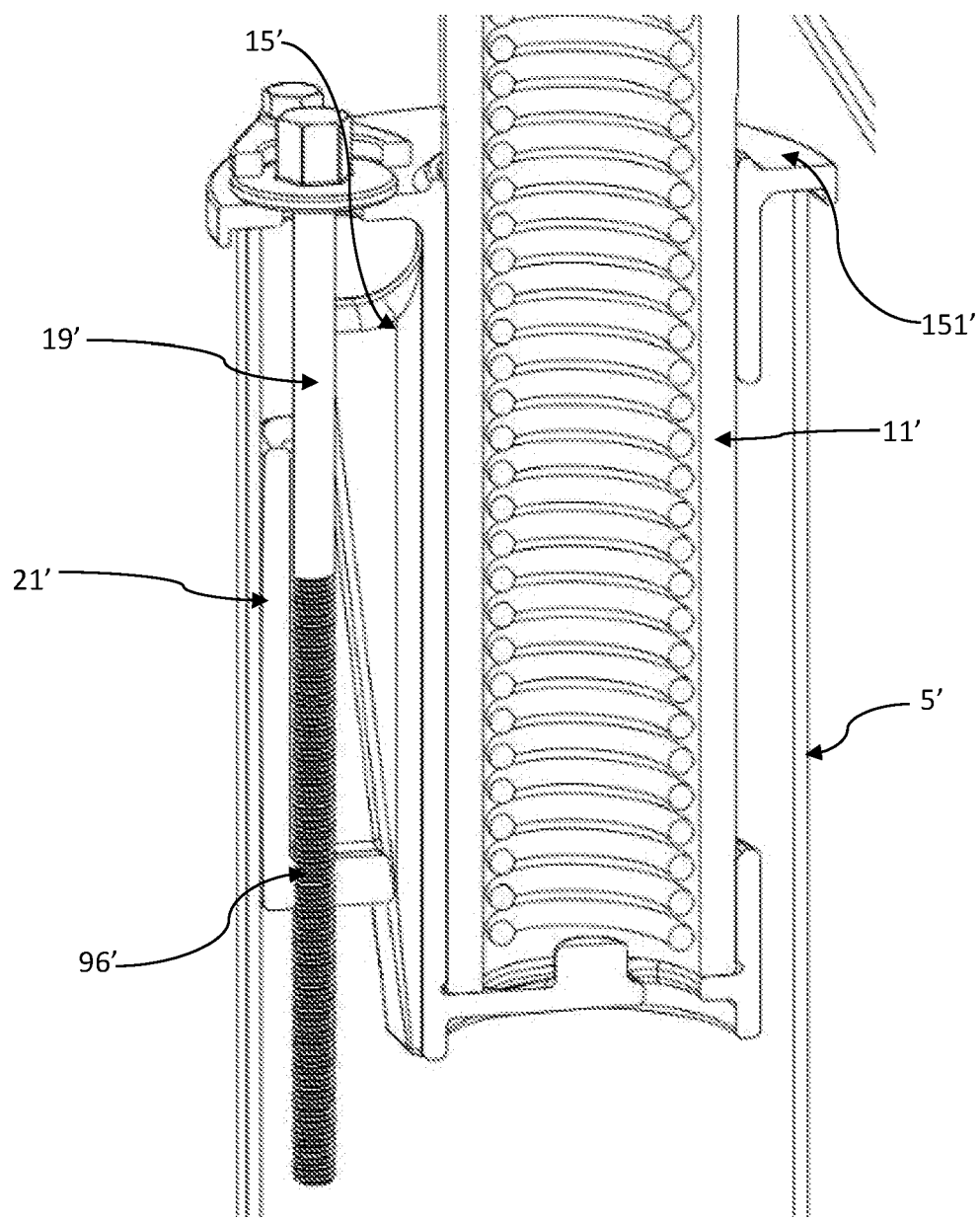
FIG. 9B shows, in cross section, the heliostat securing assembly of FIG. 4 received in the foundation post.

Referring now to FIGS. 9A and 9B, a general method of securing the heliostat 1' to the tubular foundation post 5' will be described in more detail. It will be appreciated that the method involving this embodiment of the invention is similar to that of the earlier embodiment.

The insert in the form of collet sleeve 15' of the securing assembly 3' is initially fitted to the support shaft 11' of the heliostat 1, with said support shaft 11' being received within the aperture 17' defined by the collet sleeve 15'. The support shaft 11' is a hollow cylindrical section with a torsional spring 12' installed inside to provide tension to the drive assembly around the azimuth adjustment axis. Accordingly, base portion 24' of the collet sleeve 15' can be used to retain and enclose the spring 12' in the support shaft 11'. The clamping wedge 21' is then operatively engaged with the collet sleeve 15'. This is achieved by first aligning the lower open end of channels 94' of clamping wedge 21' with the upper end of tongues 76' of the track portions 72' of collet sleeve 15'. Once aligned, the clamping wedge 21' can be slid into the desired axial position, with the maximum position, i.e. the lowest axial position of the clamping wedge 21' relative to collet sleeve 15' being reached when the upper end of tongues 76' abut the closed end of channels 94'. However, as best shown in FIG. 9A, the preferred placement of the clamping wedge 21' relative to the collet sleeve 15' is towards the lowest axial position of the clamping wedge 21' relative to the collet sleeve 15' so that radially the clamping wedge 21' is close to fully retracted.

Once the desired position between the collet sleeve 15' and the clamping wedge 21' is set, the clamping bolt 19' is placed through bolt aperture 154' in cover portion 151', and through the elongate aperture 19.2' in order to suitably connect the insert and the clamping wedge 21'. It will be appreciated that as part of this connecting step, clamping bolt 19' is threadably engaged with internal thread 96' of clamping wedge 21' in order to fix the desired initial position between clamping wedge 21' and the collet sleeve 15'.

The assembly of the insert, clamping wedge 21' and clamping bolt 19' is then located in the upper opening in the foundation post 5'. Thus, the entire securing assembly 3' with the heliostat 1' is inserted as a single unit. As previously mentioned, the support shaft 11' may be non-concentric with the foundation post 5' as is the case in this example. This allows for reduction in mass of the collet sleeve 15' by allowing the contact projections 82' to be smaller as they do not have to span as far from collet sleeve 15', and this also provides more freedom of movement for clamping wedge 21', situated substantially opposite contact projections 82', within the foundation post 5'.

Clamping bolt 19' can then be operated to urge the clamping wedge 21' axially towards cover portion 151' of the collet sleeve 15'. As will be appreciated, rotation of clamping bolt 19', which has its axial movement restricted, will cause the clamping wedge 21', through the above described threaded engagement, to move axially along the clamping bolt 19' towards cover portion 151'. This movement will also cause relative axial movement between the clamping wedge 21' and the collet sleeve 15' as the channels 94' slide along tongues 76' of track portions 72'. Thus, the clamping wedge 21' will be pulled up, i.e. move axially relative to collet sleeve 15', towards cover portion 151' to the position shown in FIG. 9B.

Due to the earlier described inclination, this relative axial movement between the collet sleeve 15' and the clamping wedge 21' simultaneously urges the clamping wedge 21' in the transverse or radial direction as the inner bearing surface 22' of clamping wedge 21' slides along the outer bearing surface of the collet sleeve 15'. Further still, this transverse movement will also cause transverse movement of collet sleeve 15', thereby causing stationary reaction members 80', and specifically contact projections 82', to bear against the inner wall of foundation post 5' on the side substantially opposite the clamping wedge 21'. The combination of the bearing loads provided by the outer bearing surface 26' of the clamping wedge 21' and the contact projections 82' of the collet sleeve 15' provides a more even and balanced distribution of load against the inner wall of the foundation post 5'. Thus, the clamping wedge 21' and the stationary reaction members 80' are thereby wedged firmly between the collet sleeve 15' and the foundation post 5', clamping the securing assembly 3' between the support shaft 11' and foundation post 5' and securing the heliostat 1' to the foundation post 5'.

It will also be appreciated that removal of the single unit made up of the entire securing assembly 3' with the heliostat 1' can simply be achieved by first removing the environmental plugs from the apertures in cover portion 151', and fixing the retaining member 160' thereto. The retaining member 160' will then restrain the head of clamping bolt 19' such that rotation of the clamping bolt 19' in the opposite direction causes the opposite sequence of movement between the clamping wedge 21 and the collet sleeve 15' to occur. Once the clamping wedge 21' has been sufficiently retracted, i.e. moved axially downward relative to collet sleeve 15' (and consequently radially inwardly), the unit can be simply lifted out of the upper opening of the foundation post 5'.

As will be appreciated to a person skilled in the art, this embodiment of the invention is only exemplary. Any of the variations contemplated with respect to the earlier embodiment may also equally apply in relation to this further embodiment.

Furthermore, it will be appreciated that other variations to this embodiment of the invention are contemplated. For example, the track portions and tongues may instead be provided on the clamping wedge, with the channels provided on the collet sleeve. The number of clamping wedges, stationary reaction members and contact portions may vary. Similarly, the arrangement may include equi-spaced clamping wedges engageable around the entire circumference of the collet sleeve rather than only a portion of the collet sleeve.

The insert and clamping wedge may be constructed of any suitable material, including steel, cast iron, and aluminium. However, it will be appreciated that other materials may be suitable so long as they are capable of withstanding the operating loads expected to be encountered.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A heliostat securing assembly for securing a heliostat to a tubular foundation post, the heliostat securing assembly comprising:
   an insert locatable within an upper opening in the foundation post, the insert defining an aperture for receiving a support shaft of the heliostat;
   a clamp arrangement for locating the insert in the upper opening in the foundation post, the clamp arrangement having at least one inner or outer bearing surface configured to bear against at least one corresponding outer or inner bearing surface of the insert; and
   one or more urging connectors for connecting the insert and the clamp arrangement, the one or more urging connectors being operable to urge at least one of the insert and the clamp arrangement toward the other in an axial direction of the foundation post,
   wherein at least one of the at least one outer or inner bearing surface and the at least one corresponding inner or outer bearing surface is configured to transform at least a portion of relative axial movement between the insert and the clamp arrangement into relative transverse movement such that, when the insert is located in the upper opening in the foundation post, operation of the one or more urging connectors urges at least one of the insert and clamp arrangement in a transverse direction to clamp the securing assembly between the support shaft and foundation post and thereby secure the heliostat to the foundation post.

2. The heliostat securing assembly according to claim 1, wherein at least one of the at least one outer or inner bearing surface of the insert and at least one of the at least one corresponding inner or outer bearing surface of the clamp arrangement are inclined to the axial direction.

3. The heliostat securing assembly according to claim 1, wherein one of the insert and the clamp arrangement comprises at least one locating flange configured to axially locate the securing assembly in the upper opening of the foundation post prior to the one or more urging connectors being operated to urge at least one of the insert and the clamp arrangement toward the other.

4. The heliostat securing assembly according to claim 3, wherein the at least one locating flange comprises a continuous cover portion configured to fit over an upper peripheral edge of the upper opening of the foundation post.

5. The heliostat securing assembly according to claim 4, wherein the cover portion has a lower face with an annular recess defined therein for accommodating upper peripheral edge of the upper opening of the foundation post.

6. The heliostat securing assembly according to claim 4, wherein the insert comprises the cover portion and an integrally formed insert portion extending from the cover portion into the foundation post when the cover portion is fitted over the upper peripheral edge of the upper opening of the foundation post, the at least one outer bearing surface being formed on the insert portion.

7. The heliostat securing assembly according to claim 6, wherein the support shaft of the heliostat is cylindrical and the aperture defined by the insert is a complemental cylindrical aperture that extends through the cover portion and into the insert portion.

8. The heliostat securing assembly according to claim 4, wherein operation of the one or more urging connectors urges the clamp arrangement toward the insert in the axial direction.

9. The heliostat securing assembly according to claim 1, wherein the tubular foundation post comprises a circular hollow section.

10. The heliostat securing assembly according to claim 9, wherein the insert comprises the cover portion and an integrally formed insert portion extending from the cover portion into the foundation post when the cover portion is fitted over the upper peripheral edge of the upper opening of the foundation post, the at least one outer bearing surface being formed on the insert portion, wherein the at least one outer bearing surface is a single, continuous outer bearing surface that describes a frusto-conical profile.

11. The heliostat securing assembly according to claim 1, wherein the clamp arrangement has at least one outer or inner clamping surface for forming a friction fit with the foundation post or heliostat support shaft after operation of the one or more urging connectors to secure the heliostat to the foundation post.

12. The heliostat securing assembly according to claim 10, wherein the clamp arrangement comprises a plurality of clamping wedges, the inner or outer bearing surfaces being formed by an inclined surface on each clamping wedge of the plurality of clamping wedges.

13. The heliostat securing assembly according to claim 12 wherein the clamping wedges are arcuate when viewed in the axial direction of the foundation post and the inclined bearing surface of each clamping wedge cooperates with a single, continuous outer or inner bearing surface that describes a frusto-conical profile.

14. The heliostat securing assembly according to claim 1, wherein the clamp arrangement comprises a single clamping wedge, the at least one inner or outer bearing surfaces being formed by an inclined surface on the clamping wedge, and a corresponding inclined surface on the insert, and the securing assembly includes a single urging connector connecting the clamping wedge to the insert.

15. The heliostat securing assembly according to claim 14, wherein the aperture for receiving the support shaft of the heliostat and the upper opening of the foundation post is not concentric when in the clamped position.

16. The heliostat securing assembly according to claim 14, wherein the insert includes the inclined outer bearing surface and guide means, and the clamping wedge includes the inclined inner bearing surface and complemental guide means interengagable with the guide means to enable sliding movement of the bearing surfaces.

17. The heliostat securing assembly according to claim 14, wherein the insert includes one or more stationary reaction members extending radially therefrom, on a side substantially opposite to the clamping wedge, the one or more stationary reaction members configured to press against an inner wall of the foundation post when transverse movement of the clamping wedge occurs.

18. The heliostat securing assembly according to claim 17, wherein each stationary reaction member includes a plurality of axially spaced contact projections.

19. The heliostat securing assembly according to claim 17, wherein the stationary reaction members are spaced between about +/−30° to +/−80° relative to a transverse axis when viewed in plan and passing through a center line of the wedge.

20. The heliostat securing assembly according to claim 16, wherein the clamping wedge is substantially in a shape of a frusto-conical segment, having an inner bearing surface from which complementary guide means of the clamping wedge extend.

21. The heliostat securing assembly according to claim 20, wherein the complemental guide means are a pair of spaced channel defining portions, each respective channel defining portion, with the inner bearing surface, defining an inner channel configured to slidably receive complemental tongues formed on track portions of the insert.

22. The heliostat securing assembly according to claim 14, wherein the urging connector extends through an aperture in the insert and is operable on the clamp arrangement.

23. The heliostat securing assembly according to claim 22, wherein the urging connector comprises a clamping bolt with a drive head operable from above the insert, and a threaded nut or sleeve positioned in or below the clamp arrangement.

24. The heliostat securing assembly according to claim 14, wherein the securing assembly further includes an attachable retaining member configured to restrict axial movement of the urging connector out of the securing assembly when operated.

25. The heliostat securing assembly according to claim 14, wherein the urging connector is in the form of a clamping bolt having an external threaded portion configured to threadingly engage an internal threading portion of the clamping wedge, wherein the threaded engagement facilitates the axial movement between the insert and the clamping wedge.

26. A method of securing a heliostat to a tubular foundation post, the method comprising the steps of:
fitting an insert of a securing assembly to a support shaft of the heliostat, the insert defining an aperture for receiving said support shaft;
locating the insert in the upper opening in the foundation post with a clamp arrangement, the clamp arrangement having at least one inner or outer bearing surface configured to bear against at least one outer or inner bearing surface of the insert; and
operating one or more urging connectors that connect the insert and the clamp arrangement to urge at least one of the insert and the clamp arrangement toward the other in an axial direction of the foundation post such that at least one of the insert and clamp arrangement is urged in a transverse direction to clamp the securing assembly between the support shaft and foundation post and thereby secure the heliostat to the foundation post.

27. The method of securing a heliostat according to claim 26, wherein the securing assembly accords with claim 1.

28. A heliostat arrangement comprising:
a tubular foundation post;
a heliostat securing assembly, the heliostat securing assembly received in an open upper end of the tubular foundation post; and
a heliostat comprising:
a drive assembly comprising a support shaft received in the heliostat securing assembly; and a mirror supported on the drive assembly such that the heliostat mirror can be adjusted by the drive assembly to track the sun and keep it focused on a receiver or target, wherein the securing assembly is clamped between the support shaft and foundation post to thereby secure the heliostat to the foundation post.

\* \* \* \* \*